United States Patent [19]

Ide

[11] Patent Number: 5,487,090
[45] Date of Patent: Jan. 23, 1996

[54] SELECTIVELY CALLED RADIO RECEIVER IN WHICH BIT RATE DETECTION IS CONTROLLED WITH A PREDETERMINED RANGE

[75] Inventor: Motoki Ide, Tokyo, Japan

[73] Assignee: NEC Corporation, Tokyo, Japan

[21] Appl. No.: 134,683

[22] Filed: Oct. 12, 1993

[30] Foreign Application Priority Data

Oct. 12, 1992 [JP] Japan .................................. 4-272165
Oct. 23, 1992 [JP] Japan .................................. 4-285664

[51] Int. Cl.⁶ .............................. H04L 7/00; H04Q 7/00
[52] U.S. Cl. ...................... 375/316; 375/368; 370/105.5; 455/343; 455/38.3; 340/825.14
[58] Field of Search ...................... 375/316, 354, 375/365–366, 368; 370/84, 105.5, 106; 455/38.3, 343; 340/825.14, 825.44

[56] References Cited

U.S. PATENT DOCUMENTS

| | | | |
|---|---|---|---|
| 4,663,623 | 5/1987 | Lax et al. | 340/825.44 |
| 4,839,639 | 6/1989 | Sato et al. | 340/825.44 |
| 5,095,498 | 3/1992 | DeLuca et al. | 375/340 |
| 5,142,699 | 8/1992 | Sato et al. | 455/343 |
| 5,148,160 | 9/1992 | Kudoh | 340/825.44 |
| 5,241,568 | 8/1993 | Fernandez et al. | 375/368 |
| 5,287,099 | 2/1994 | Tsunoda | 340/825.44 |
| 5,296,849 | 3/1994 | Ide | 455/38.3 |
| 5,379,030 | 1/1995 | Nolan et al. | 340/825.44 |

FOREIGN PATENT DOCUMENTS

| | | | |
|---|---|---|---|
| 0234201 | 9/1987 | European Pat. Off. . | |
| 2005633 | 1/1990 | Japan | 455/38.3 |
| 4132321 | 5/1992 | Japan | 455/38.3 |
| 9110282 | 7/1991 | WIPO . | |

*Primary Examiner*—Young Tse
*Attorney, Agent, or Firm*—Sughrue, Mion, Zinn, Macpeak & Seas

[57] ABSTRACT

In a selectively called radio receiver in which a demodulated signal of a specific bit rate is produced with battery saving kept in synchronism with the demodulated signal, a bit rate detecting unit detects the bit rate with a controllable sensitivity while the synchronism is lost. A bit rate detecting control arrangement controls the sensitivity within a predetermined sensitivity range. The bit rate detecting unit may misdetect the bit rate with a variable misdetection rate which is accumulated to an incremented amount from an initial amount representative of no misdetection while the synchronism is lost. The bit rate detection control arrangement may decrement the misdetection rate to the initial amount when the incremented amount reaches a predetermined amount. Alternatively, the bit rate detection control arrangement may control the misdetection rate between a greater and a smaller amount and then cause the misdetection rate to return to the initial amount. In either event, the bit rate detection control arrangement controls the sensitivity within a predetermined range.

8 Claims, 10 Drawing Sheets

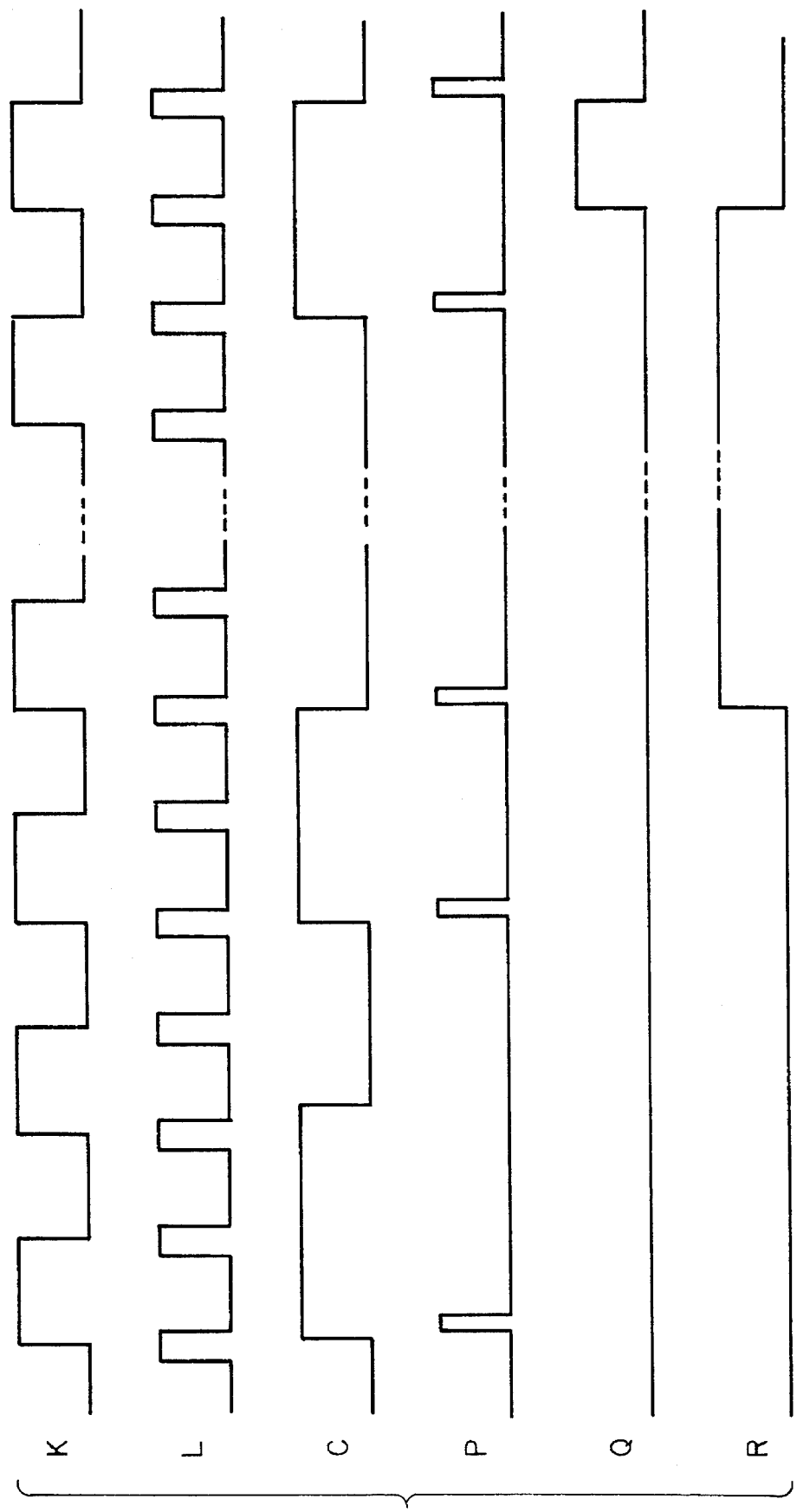

FIG. 12
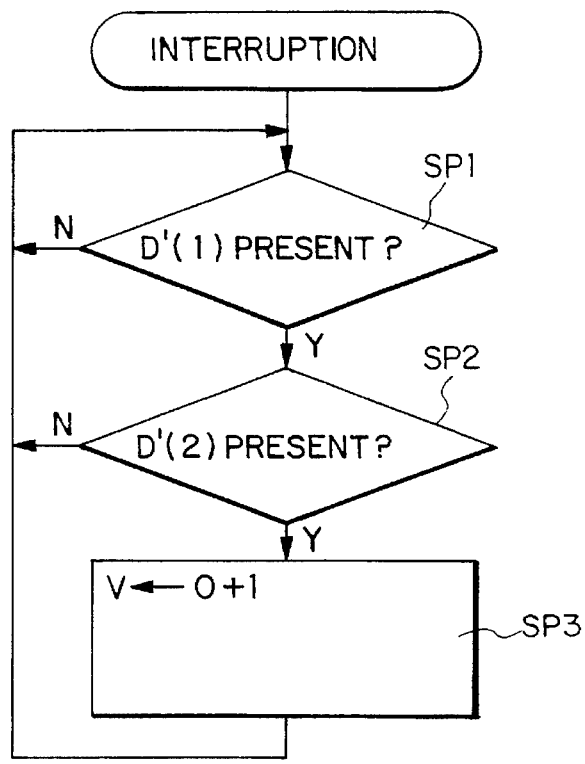
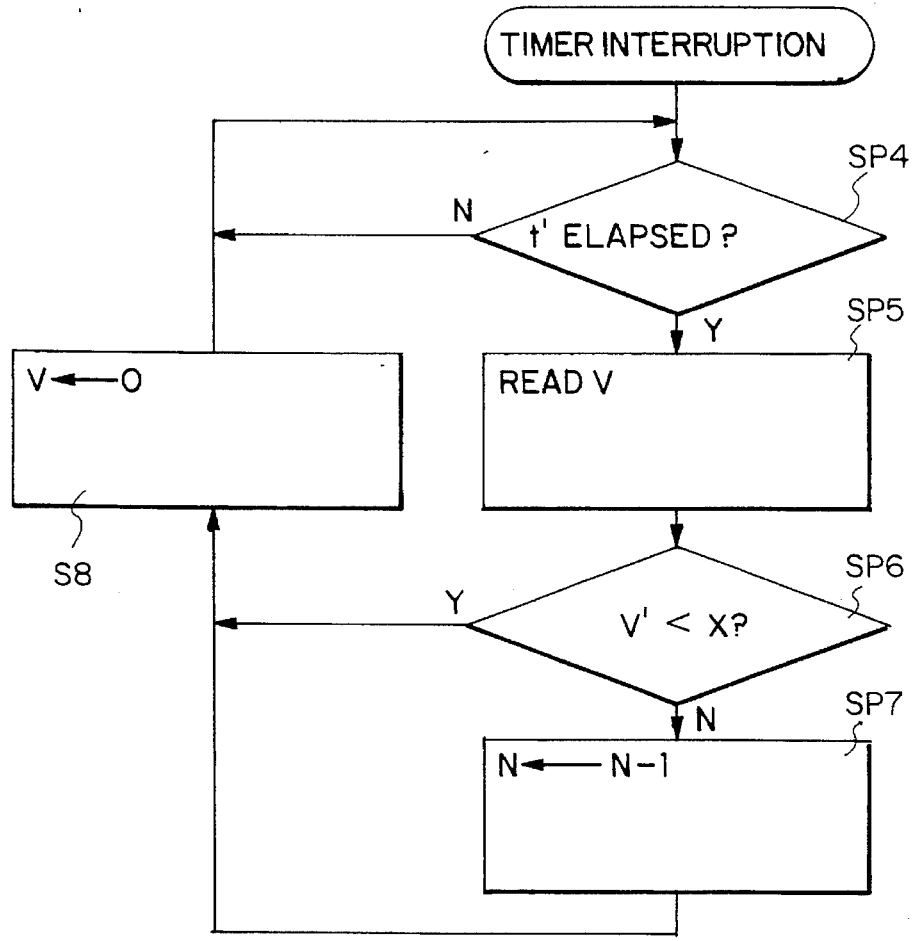

SELECTIVELY CALLED RADIO RECEIVER IN WHICH BIT RATE DETECTION IS CONTROLLED WITH A PREDETERMINED RANGE

BACKGROUND OF THE INVENTION

This invention relates to a radio receiver which is selectively called as a selectively called radio receiver to receive a message signal with battery savings. Such a radio receiver is typically used either as a pager receiver of a radio telephone network or in a mobile station of a mobile communication network.

By the radio receiver which is of the type described and is energized by a battery, a radio signal is received as a received signal with a battery saving operation of fully using the battery only while necessary. The radio signal includes a selective call signal which is specific to the radio receiver under consideration and is used in selectively calling the radio receiver in question.

A basic format for the radio signal is specified in a reference which was published Autumn 1980 under the title of "Standard Message Formats for Digital Radio Paging" by the Post Office Code Standardisation Advisory Group (POCSAG) of London, the United Kingdom. In accordance with the format of the POCSAG reference which format will later be exemplified more in detail, the radio receiver is put in operation in a time division fashion. The radio signal and consequently the received signal derived from the radio signal with no errors will herein be referred to alternatively as a POCSAG signal.

The POCSAG signal has a specific bit rate at a time for at least specific receivers including the selectively called radio receiver among the radio receivers of the network and is given by a plurality of serial batch streams, each comprising a preamble signal and a succession of batches following the preamble signal. The batches comprise synchronization signals, respectively. In each batch, a sequence of "groups" of bits follows the synchronization signal of the batch under consideration. As a consequence, one of the synchronization signals of the batches immediately follows the preamble signal in each batch stream as an immediately following signal of such synchronization signals.

As a specific group, one of the groups of the batch streams carries an individual call signal indicative of a particular receiver of the specific receivers. In order to be received by the particular receiver, an individual message signal is carried by the groups following the specific group in the batch stream or streams and including the specific group or groups other than the specific group by which the individual call signal is carried. The selective call signal is carried as such an individual call signal by a predetermined group of the batch streams. As such an individual message signal, the first-mentioned message signal is herein referred to alternatively as a particular message signal and is carried by the groups which follow the predetermined group as described above.

In the manner which will later be described in greater detail, the radio receiver includes a receiving unit supplied with the received signal to produce a demodulated signal of the specific bit rate with the battery saving operation. A synchronizing unit establishes and keeps synchronism between the demodulated signal and operation of the receiving unit. More particularly, the synchronizing unit detects the preamble signal and the immediately following signal in each batch stream to intermittently release or suspend the battery saving operation and to thereby render the radio receiver alive, namely, to put the receiving unit in full operation of detecting the selective call signal and, after the selective call signal is received, in full operation of receiving, together with the synchronization signal or signals, the particular message signal.

It should be noted in connection with the foregoing that the preamble signal is included only once in each batch stream. The received signal may be subjected to fading to give rise to a failure in detection of the preamble signal. Alternatively, the received signal may be adversely affected by noise to include a false signal which is misdetected as the synchronization signal while the selective call signal and the particular message signal are received. Such a failure and/or a misdetection result in collapse of the synchronism. Once the synchronism is lost, the receiving unit can no more detect the selective call signal and/or the particular message signal.

The radio receiver therefore comprises a bit rate detecting unit for detecting the specific bit rate to produce a bit rate detection signal for use in assisting or supplementing operation of the synchronizing unit. More specifically, the bit rate detecting unit detects the specific bit rate to restors the synchronism.

Bit rate detection may, however, give rise to occurrence of false synchronism, namely, to an increase in undesired occurrences of misdetection of the bit rate if the bit rate is detected with a high sensitivity in order to avoid failure of detection of the bit rate. The misdetection may take place because the received signal may have a pseudo or false bit rate due to the adverse effects. The misdetection results in an objectionable amount of consumption of the battery.

It is possible to preliminarily select for each radio receiver of the network a parameter for determining the sensitivity of bit detection to reduce the undesired occurence of misdetection. The sensitivity, however, varies to a great extend in dependency on a manner in which the radio signal is transmitted from a base station of the network. As a result, it is impossible to change the parameter unless the radio receivers of the network are all withdrawn for adjustment of the parameter. Consequently, use of the parameter is objectionable.

SUMMARY OF THE INVENTION

It is therefore a principal object of the present invention to provide a radio receiver which is of the type described and which can restore synchronism between a demodulated signal and operation of a receiving unit of the radio receiver without adversely affecting technical merits achieved by battery saving.

It is another principal object of this invention to provide a radio receiver which is of the type described and in which the synchronism is assured by detection of a bit rate of the demodulated signal with a sensitivity of detection of the bit rate restricted within a predetermined sensitivity range.

It is a subordinate object of this invention to provide a radio receiver which is of the type described and in which the bit rate is detected with a high sensitivity until the bit rate is detected.

It is a different subordinate object of this invention to provide a radio receiver which is of the type described and in which the bit rate is detected to keep a rate of misdetection of the bit rate within a predetermined rate range.

It is another different subordinate object of this invention to provide a radio receiver which is of the type described and in which the bit rate is detected with the high sensitivity and with an ordinary sensitivity when occurences of misdetection are below a first rate and after the occurrences reach a second rate which is smaller than the first rate.

Other objects of this invention will become clear as the description proceeds.

In accordance with this invention, there is provided a selectively called radio receiver which includes a receiving unit operable with battery saving to produce a demodulated signal having a specific bit rate and comprises: (A) a synchronizing unit for establishing and keeping synchronism between the demodulated signal and operation of the receiving unit; (B) a bit rate detecting unit for detecting the bit rate with a controllable sensitivity to assist operation of the synchronizing unit when the synchronising unit fails to keep the synchronism; and (C) bit rate detection control means connected to the synchronizing and the bit rate detecting units for controlling the sensitivity within a predetermined sensitivity range while the synchronizing unit fails to keep the synchronism.

BRIEF DESCRIPTION OF THE DRAWING

FIG. 6 is a time chart for use in describing operation of the bit rate detecting unit depicted in FIG. 5;

FIG. 5, is a block diagram of a synchronism control circuit for use in the decoder unit depicted in FIG. 4;

· FIG. 12 is a flow chart for use in describing operation of the processor unit mentioned in connection with FIG. 11.

DESCRIPTION OF THE PREFERRED EMBODIMENTS

Figure 1:
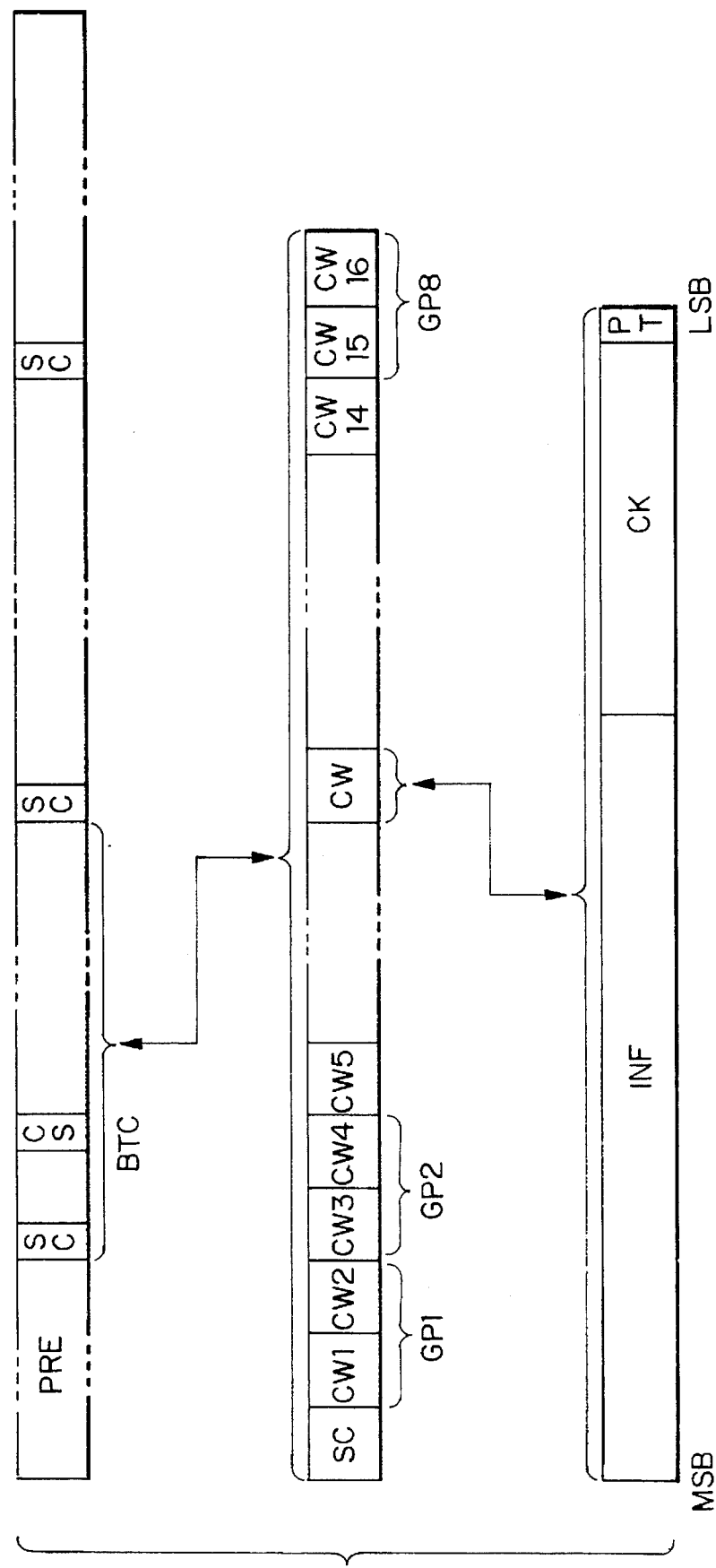
FIG. 1 shows a format of a signal received as a received signal by a radio receiver operable with battery saving.

Referring to FIG. 1, a format of a radio signal will first be exemplified in order to facilitate an understanding of the present invention. The format is described in the POCSAG reference cited hereinabove. The radio signal is herein referred to alternatively as a POCSAG signal and is received as a received signal by a radio receiver operable with battery saving.

The radio receiver is typically used either as a pager receiver of a radio telephone network or in a mobile station of a mobile communication network. The radio receiver is selectively called as a selectively called radio receiver by a selective call signal specific thereto and is rendered alive, namely, put in operation by a battery (not shown) with the radio receiver intermittently energized to a full extent only while necessary. The POCSAG signal has a specific bit rate at a time for at least specific receivers including the selectively called radio receiver among similar receivers of the network.

In accordance with the format, the radio signal is given by a plurality of serial batch streams. One of the batch streams is illustrated along a first or top row. Such a batch stream comprises a preamble signal PRE of 576 bits which alternatingly represent binary one and binary zero bits 101010 . . . . A succession of batches RTC follows the preamble signal.

In the manner depicted along a second or middle row, each batch comprises a synchronization signal SC of a predetermined bit pattern of thirty-two bits. A plurality of "groups" of bits follow the synchronization signal. The batches of each batch stream therefore includes such synchronization signals. The synchronization signals of the batch streams are for keeping synchronism between the received signal and operation of the radio receiver. One of the synchronization signals of each batch stream immediately follows the preamble signal as an immediately following signal.

In the example being illustrated, the groups consist of first through eighth groups GP1 to GP8. Each group consists of two code words CW's. As a consequence, each synchronization signal is followed by a sequence of first through sixteenth code words CW1 to CW16. The specific receivers are divided into receiver groups equal in number to the groups in each batch. In this manner, it is possible to understand that the groups of each batch are in one-to-one correspondence to the receiver groups at a time.

One of the groups of the batch streams may carry an individual call signal that is labelled CS in the top row and indicates a particular receiver of one of the receiver groups that corresponds to the above-mentioned one of the groups when the individual call signal is included in the batch streams. In the illustrated example, the selective call signal is carried by the third code word of one of the batches as the individual call signal and indicates the selectively called radio receiver. In other words, the second group is the predetermined group mentioned heretobefore in the batch streams. It is possible to presume without loss of generality that the second group in question is included in the batch which directly follow the preamble signal as a directly following batch.

As the individual message signal which is mentioned hereinabove and should be received by the selectively called radio receiver, the particular message signal is carried by the code words which follow the second group under consideration. The particular message signal may continue throughout at least one batch stream comprising the batch stream which includes the second group in question. When continued during a plurality of batch streams, the particular message signal is interspersed with the preamble signal or signals and with the synchronization signals and is carried also by the second group or groups other than the second group by which the selective call signal is carried in the batch streams.

As illustrated along a third or bottom row, each code word consists of zeroth or most significant bit BSB through thirty-first or least significant bit LSB. These thirty-two bits are used as twenty-one information bits INF, ten check bits CK, and one parity bit PT. Consisting also of thirty-two bits, the synchronization signal is similar in structure to each code word except for their bit patterns.

When attention is directed to only one of the code words, a part of the message signal will be called a message signal piece. If the individual call signal is represented by one of two code words of the specific group and at least a portion of the other of these two code words, each of these two code words represents a call signal piece. Each of the message and the call signal pieces is represented by a BCH(31, 21) code of Bose, Chaudhuri, and Hocqenghem (BCH), with binary zero and binary one bits used as the most significant bit of the message and the call signal pieces, respectively.

Incidentally, each batch has a batch period. Each batch sream has a stream period, which is an integral multiple of the batch period length.

Figure 2:
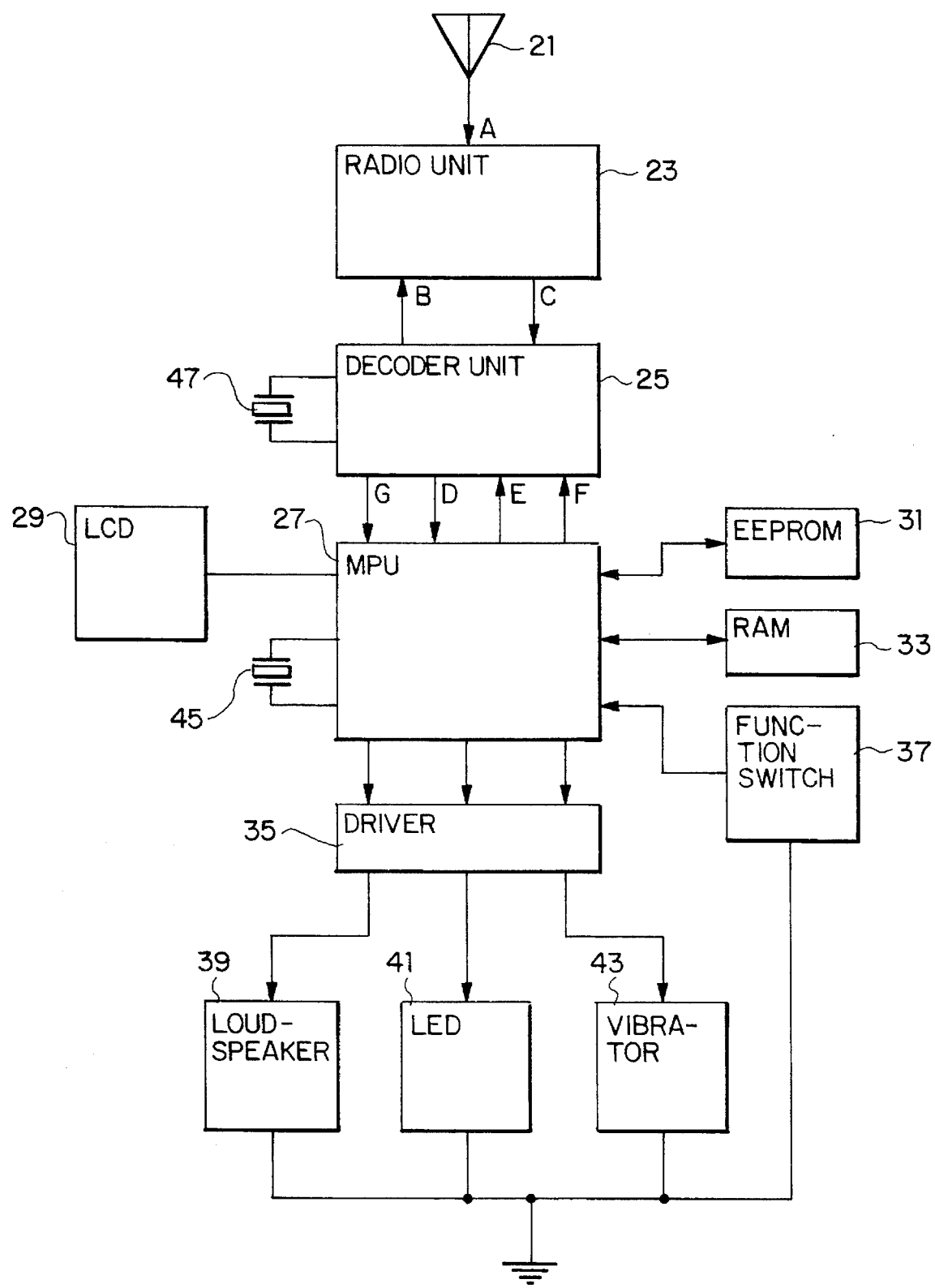
FIG. 2 is a block diagram of a radio receiver which is operable as a selectively called radio receiver in accordance with a first embodiment of the instant invention.
Figure 3:
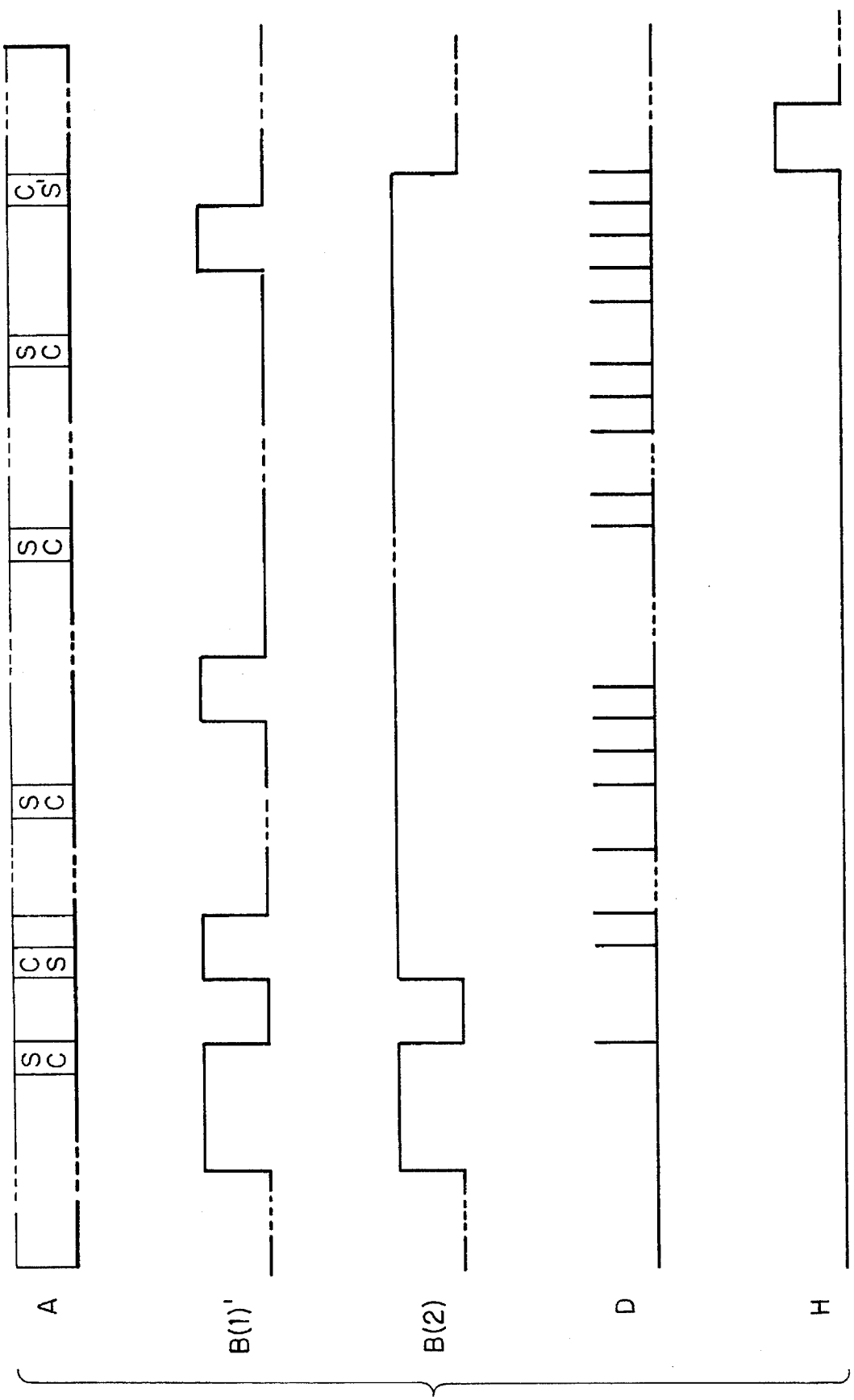
FIG. 3 shows a time chart for use in describing operation of the radio receiver illustrated in FIG. 2.

Referring now to FIG. 2, a radio receiver is of the type described and can be used as a selectively called radio receiver according to a first embodiment of this invention. FIG. 3 will additionally be referenced with FIG. 1 continuously referred to.

In FIG. 2, an antenna 21 receives a radio signal to deliver a received signal A to a radio unit 23 which is intermittently energized to a full extent with battery saving of a battery (not shown) through a decoder unit 25. The received signal is theoretically the POCSAG signal described above and is illustrated along a first or top row labelled A.

The radio unit 23 and the decoder unit 25 are herein referred to collectively as a receiving unit and are controlled for the battery saving by a battery save control signal B supplied to the radio unit 23 from the decoder unit 25. While fully energized, the radio unit 23 demodulates the received signal into a demodulated signal C for delivery to the decoder unit 25.

It will be presumed that the receiver unit (23, 25) is put in a preamble signal search mode of operation of detecting the preamble signal PRE with the battery control signal given a low or very slightly high level capable of sufficiently saving the battery. When the preamble signal begins to appear, a high level is given to the battery save control signal for full energization of the radio unit 23 in the manner depicted in FIG. 3 along a second row labelled B(1).

It will additionally be presumed for the time being that one of the preamble signals of the batch streams is successively detected. The receiving unit 23 is put in a synchronization signal search mode of operation of detecting at least the immediately following signal of the synchronization signals with the battery save control signal kept at the high level. After the immediately following signal is detected, a zero level is given to the battery save control signal. Subsequently, the high level is given to the battery save control signal intermittently during the third and the fourth code words of each batch of the batch streams to put the receiving unit 23, in the manner depicted in FIG. 3 along the second row B(1), in a call signal search mode of operation of detecting the selective call signal.

When the selective call signal is detected, the high level is continuously given to the battery save control signal to put the receiving unit a message signal reception mode of operation of receiving the message signal as examplified in FIG. 3 along a third row labelled B(2). The message signal follows the selective call signal and is therefore the particular message signal directed to the radio receiver being illustrated. The battery save control signal is kept at the high level for reception of the message signal until the message signal comes to an end. Together with detection of the preamble signal, the synchronization signal, the selective call signal, and the message signal, detection of the end will presently be described.

In this manner, the decoder unit 25 establishes and keeps synchronism between the battery save control signal B and the demodulated signal C. In other words, the synchronism is established and kept between the demodulated signal and operation of the receiving unit (23, 25), or in more particular, of the decoder unit 25.

The decoder unit 25 is supplied from the radio unit 23 with the demodulated signal and supplies a processor unit 27 with an interruption signal D which will become clear as the description proceeds and is exemplified in FIG. 3 along a fourth row with the label D. In practice, the processor unit 27 is a microprocessor unit (MPU) having a work area and is accompanied by a liquid crystal dysplay unit (LCD) 29, an electrically erasable programmable read-only memory (EEPROM) 31, a random access memory (RAM) 33, a driver 35, and three function switches 37. The driver 35 is accompanied in turn by a loudspeaker 39, a light emitting diode (LED) 41, and a vibrator 43.

As will shortly be described, the decoder unit 25 is supplied from the processor unit 27 with an address signal through an address bus E, exchanges with the processor unit 27 a decoder output signal and a decoder input signal through a data bus F, and generates reference clock pulses G at the specific bit rate for delivery to the processor unit 27. Supplied with the decoder output signal, the processor unit 27 delivers a text signal to the liquid crystal display unit 29 for visual display of a text represented by the text signal in letters and others.

A program is stored in the electrically erasable programmable read-only memory 31 to specify operation of the processor unit 27 and, in cooperation with at least one of the three function switches 37 that is manually or otherwise set, to select at least one of the loudspeaker 39, the light emitting diode 41, and the vibrator 43 and to make the liquid crystal display unit 29 repeatedly display, if desired, the text. In addition, a selective call datum specific to the radio receiver under consideration is stored preliminarily in the electrically erasable programmable read-only memory 31.

The random access memory 33 comprises a buffer region and a message memory region (both not shown). A processor clock oscillator piece 45 accompanies the processor unit 27 for use in generating a processor clock signal depicted in FIG. 3 along a fifth or bottom row labelled H.

In the manner which will soon be described, the processor unit 27 is controlled usually by the reference clock pulses and later by the processor clock signal. The processor unit 27 responds to the decoder output signal to refer to the selective call datum for supply of the address signal and the decoder input signal to the decoder unit 25. Furthermore, the processor unit 27 delivers a drive signal to the driver 35 and thence to the above-mentioned at least one of the loudspeaker 39, the light emitting diode 41, and the vibrator 43 to inform an attendant to the radio receiver of delivery of the text signal to the liquid crystal display unit 29.

Referring afresh to FIG. 4 and again to FIGS. 2 and 3, the decoder unit 25 is accompanied by a reference clock oscillator piece 47 and comprises a reference clock generator 49 comprising the reference clock oscillator piece 47 to generate the reference clock pulses G. In the manner described before, the reference clock pulses are delivered to the processor unit 27.

A synchronism control circuit 51 is for primarily delivering the battery save control signal B to the radio unit 23. A bit synchronization circuit 53 is supplied from the radio unit 23 with the demodulated signal C and from the reference clock generator 49 with the reference clock pulses to generate regenerated clock pulses with a regenerated bit rate which is theoretically identical with the specific bit rate.

A preamble and synchronization signal (PRE/SC) detector 55 samples the demodulated signal supplied from the radio unit 23 by the regenerated clock pulses delivered from the bit synchronization circuit 53 to search for the preamble signal and the immediately following signal of the synchronization signals in the batch streams. The preamble and synchronization signal detector 55 thereby produces a preamble signal detection signal i and a synchronization signal detection signal j.

When supplied from the bit synchronization circuit 53 with the regenerated clock pulses and from the preamble and synchronization signal detector 55 with the preamble signal detection signal in response to the preamble signal shown in FIG. 3 along the first row and with the synchronization signal detection signal in response to the immediately following signal, the synchronism control circuit 51 produces the battery save control signal depicted in FIG. 3 at B(1) and a local group timing signal indicative of the third and the fourth code words in each batch of the batch streams of the demodulated signal. In the meantime, the synchronism control circuit 51 produces a synchronism monitor signal with a binary zero level to indicate either the preamble signal search mode or the synchronization signal search mode of operation of the receiving unit.

As will presently be described, the synchronism control circuit 51 later produces the battery save control signal illustrated in FIG. 3 at B(2) and a code word timing signal which identifies in the demodulated signal the synchronization signal and the first through the sixteenth code words of each batch. When the code word timing signal continues during a plurality of stream periods, the code word timing signal furthersome indicates the preamble signal or signals. Under the circumstances, the synchronism control circuit 51 gives a binary one level to the synchronism monitor signal to identify the message signal receiving mode and additionally the preamble and the synchronization signal search modes.

An error correcting circuit 57 is supplied from the radio unit 23 with the demodulated signal, namely, first with the third and the fourth code words and later either without or with one or more preamble signal and cyclically with the fifth through the sixteenth code words, the sychronization signal, and the first through the fourth code words. It should be noted in this connection that a part of the error correcting circuit 57 is depicted as a selective call detector 59 separately from the error correcting circuit 57. Among the signals supplied for supply to the error correcting circuit 57, the demodulated signal and the regenerated clock pulses are delivered also to the selective call detector 59. The local group timing signal is supplied solely to the selective call detector 59.

Controlled by the regenerated clock pulses and by the local group timing signal, the selective call detector 59 is put in operation which will become clear in the following. It is presumed before in connection with FIG. 1 that the third and the fourth code words may represent the selective call signal and that the message signal follows the fourth code word.

Controlled by the regenerated clock pulses and by the code word timing signal, the error correcting circuit 57 detects an error first in the selective call signal and later in the particular message signal and corrects the error or errors, if any, to produce data signal with the error or errors corrected. If the errors are detected beyond a predetermined number in each batch stream, the error correcting circuit 57 produces an out of synchronism signal. The predetermined number may be equal to only one.

Responsive to the out of synchronism signal, the synchronism control circuit 51 gives the binary zero level to the synchronism monitor signal. This switch of the binary one level to the binary zero level is used in the manner which will later be described.

An interface circuit 61 is supplied from the synchronism control circuit 51 with the synchronism monitor signal and from the error correcting circuit 57 with the data signal to deliver the data signal as a part of the decoder output signal to the processor unit 27 through the data bus F. Through the interface circuit 61, an interruption control circuit 63 is supplied with the synchronism monitor signal to deliver the interruption signal D to the processor unit 27.

When the synchronism monitor signal is given the binary zero and one levels, the interruption signal is given the binary one and zero levels, which will be denoted by 0 and 1. In the manner more particularly depicted in FIG. 3 at D, the interruption signal of the binary one level consits of a series of pulses produced at an end of the immediately following signal of the synchronization signals and at ends of the message signal pieces and when the battery save control signal is switched from the high level to the zero level.

As described above, the processor unit 27 is first controlled, at the specific bit rate, bit by bit of the data signal which is supplied thereto and represents the selective call signal and the message signal directed to the radio receiver being illustrated as the particular message signal. In cooperation with the decoder unit 25 and in compliance with the program for operation, the processor unit 27 deals with the data signal to produce the address signal, the decoder input signal, the text signal, and the drive signal.

In response to the data signal, the processor unit 27 reads the selective call datum from the electrically erasable programmable read-only memory 31 and compares the same with a datum represented by the data signal. If the data signal represents the selective call datum, the processor unit 27 supplies the decoder unit 25 with the address signal through the address bus E and, as a part of the decoder input signal, a call detection signal representative of the selective call datum.

Controlled by the regenerated clock pulses and by the local group timing signal and supplied through the interface circuit 61 with the address signal addressing the selective call detector 59 and with the call detection signal, the selective call detector 59 collates the call detection signal with pieces of the demodulated signal in the third and the fourth code words. When coincidence is detected between the call detection signal and the pieces of the demodulated signal, the selective call detector 59 delivers a coincidence signal temporarily continuously to the synchronism control circuit 51 and, for supply as a different part of the decoder output signal to the processor unit 27, to the interface circuit 61.

Responsive to the coincidence signal, the synchronism control circuit 51 keeps the battery save control signal at the high level as illustrated in FIG. 3 at B(2) to put the decoder unit 25 in the message signal receiving mode and may produce the code word timing signal. It should be noted that the code word timing signal is similar to the local group timing signal except for the code words they indicate in the batches of the batch streams in addition to the preamble signal or signals and the synchronization signal or signals. Supplied with the coincidence signal through the interface circuit 61 and through the data bus F as a further different part of the decoder output signal, the processor unit 27 stores the coincidence signal in the buffer region of the random access memory 33.

If the data signal represents a code word which follows the selective call signal and has the binary one bit at the most significant bit, the processor unit 27 confirms that the data signal does not represent an individual call signal. Instead, the processor unit 27 judges the data signal as representative of the particular message signal and stores the data signal in the buffer region as the message signal.

In addition, the processor unit 27 detects a call end to deliver a call end signal to the decoder unit 25 as a different part of the decoder input signal no later than the processor unit 27 begins to judge that the data signal no more represent the individual call signal. Responsive to the call end signal supplied through the interface circuit 61, the selective call detector 59 stops delivery of the coincidence signal to the synchronism control circuit 51 and to the processor unit 27. It is possible at this time instant of suspension of the coincidence signal for the synchronism control circuit 51 switch the local group timing signal to the code word timing signal.

Either if the data signal no more represents the text or if the data signal represents either the second group or a different group of the batch streams indicative of a different call signal CS' that is different from the selective call signal, the processor unit 27 judges that a message end is reached by the particular message signal. It is presumed again without loss of generality that the different call signal is present as exemplified in the top row of FIG. 3 in the third group which may or may not directly follow the preamble signal. At any rate, the interruption signal indicates reception of the call and the message signal pieces in this manner in cooperation with the data signal.

Using the processor clock oscillator piece 45 when the message end is reached, the processor unit 27 generates the processor clock signal. Serving as a message end signal, the processor clock signal is delivered to the data bus F as a further different part at the decoder input signal. Supplied with the message end signal through the interface circuit 61, the synchronism control circuit 51 once more produces the local group timing signal to put the decoder unit 25 again in the call signal search mode of operation.

In response to the processor clock signal, the processor unit 27 processes the message signal stored in the buffer region of the random access memory 33 and produces the text signal for storage in the message memory region of the random access memory 33. It is now possible for the liquid crystal display unit 29 to visually display the text and, if desired, repeatedly.

While storing the text signal in the message memory region, the processor unit 27 delivers the drive signal to the driver 35. Reception of the particular message signal is notified to the attendant by the afore-mentioned at least one of the loudspeaker 39, the light emitting diode 41, and the vibrator 43. It is possible to make the loudspeaker 39 announce the text by cooperation of at least one of the three function switches 37 and the program stored therefor in the electrically erasable programmable read-only memory 31. As is understood from FIG. 3, the interruption signal of the binary one level ends when the processor clock signal builds up.

Figure 4:
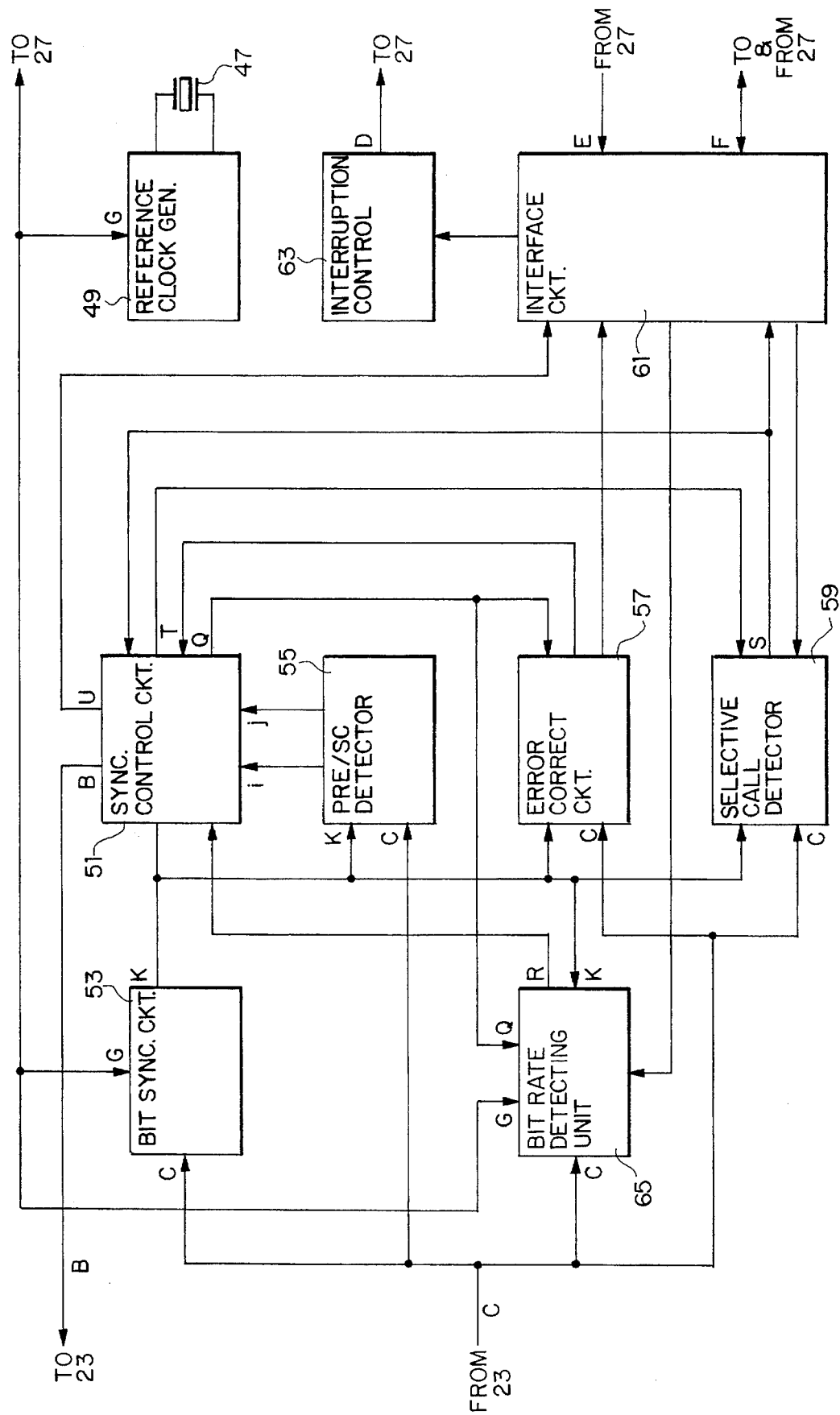
FIG. 4 shows in blocks a decoder unit for use in the radio receiver depitced in FIG. 2 and a reference clock oscillator Piece accompanying the decoder unit.

In the manner pointed out hereinabove, the radio receiver comprises a bit rate detecting unit 65. As illustrated in FIG. 4, the bit rate detecting unit 65 is conveniently located in the decoder unit 25. For use in the bit rate detecting unit 65, the processor unit 27 calculates an edge counter value in the manner later described and supplies the decoder unit 25, through the data bus F as a further different part of the decoder input signal, an edge counter value signal representative of the edge counter value. It will now be assumed that the bit rate detecting unit 65 is put in operation although it is possible as will later become clear to put the bit rate detecting unit 65 into operation and to make the processor unit 27 produce the edge counter value signal only while the demodulated signal is out of synchronism with operation of the decoder unit 25.

In FIG. 4, the bit rate detecting unit 65 is supplied from the radio unit 23 with the demodulated signal C, from the reference clock generator 49 with the reference clock pulses G, from the bit synchronization circuit 53 with the regenerated clock pulses, from the synchronism control circuit 51 with the code word timing signal, and from the interface circuit 61 with the edge counter value signal. It will be surmised that the preamble signal is subjected to the failure described hereinabove during reception of the particular message signal. In the manner which will shortly be described, the bit rate detecting unit 65 delivers a bit rate detection signal of a duration which ends when the preamble signal would be succeeded by the immediately following signal of the synchronization signals.

Throughout the duration, the synchronism control circuit 51 gives the high level to the battery save control signal in the manner depicted in FIG. 3 at B(1) or B(2) preceding the immediately following signal. Subsequently, the high level is given to the battery save control signal because the preamble signal is very likely exempted from the failure in the meantime. The decoder unit 25 is put successively in the call signal search mode and in the message signal receiving mode. Incidentally, the preamble and synchronization signal detector 55 may fail to detect the preamble signal together with the immediately following signal. The bit rate detecting unit 65 is likewise operable.

Figure 5:
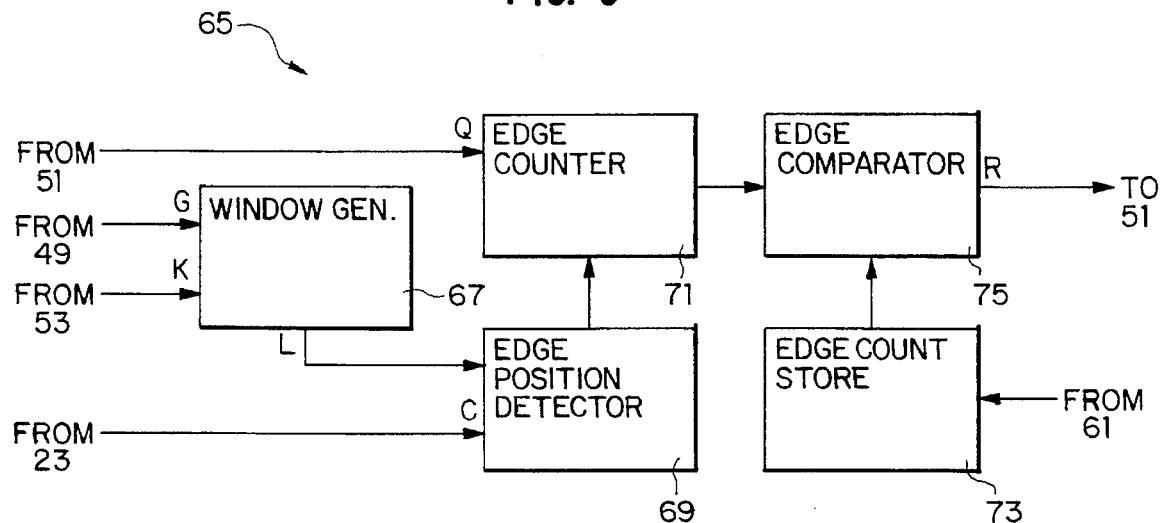
FIG. 5 is a block diagram of a bit rate detecting unit for use in the decoder unit illustrated in FIG. 4.

Turning to FIGS. 5 and 6 with FIG. 4 continuously referred to, the regenerated clock pulses are depicted in FIG. 6 along a first or top row labelled K. The bit rate detecting unit 65 comprises a window generator 67 supplied from the reference clock generator 49 with the reference clock pulses G and from the bit synchronization circuit 53 with the regenerated clock pulses and compares the reference and the regenerated clock pulses to generate a window signal illustrated in FIG. 6 along a second row labelled L.

An edge position detector 69 is supplied with the window signal and from the radio unit 23 with the demodulated signal C which bulids up and down as exemplified in FIG. 6 along a third row labelled C. The edge position detector 69 judges whether or not the demodulated signal builds up or down, namely, has an edge, during presence of pulses of the window signal to produce edge detection pulses in the manner shown in FIG. 6 along a fourth row with a label P whenever the demodulated signal builds up or down within pulse periods of the window signal.

An edge counter 71 is supplied with the edge detection pulses and from the synchronism control circuit 51 with the code word timing signal depicted in FIG. 6 along a fifth row with a label Q. Reset by the code word timing signal, the edge counter 71 produces an edge count of the edge detection pulses during each code word to produce an edge count signal representative of the edge count when the code word timing signal indicates the immediately following signal.

An edge count store 73 is supplied from the interface circuit 61 with the edge counter value signal. The edge counter value is stored in the edge count store 73 as a stored counter value. The edge count store 73 thereby producees a stored counter value signal representative of the stored counter value.

An edge comparator 75 is supplied with the stored counter value signal and from the edge counter 71 with the edge count signal to compare the edge count with the stored counter value, namely, with the edge counter value calculated by the processor unit 27. Only when the edge count is identical with the edge counter value, the edge comparator 75 delivers the bit rate detection signal to the synchronism control circuit 51. The bit rate detecting unit 65 produces in this manner, when the specific bit rate is detected in the demodulated signal, the bit rate detection signal exemplified in FIG. 6 along a sixth or bottom row labelled R.

Figure 7:
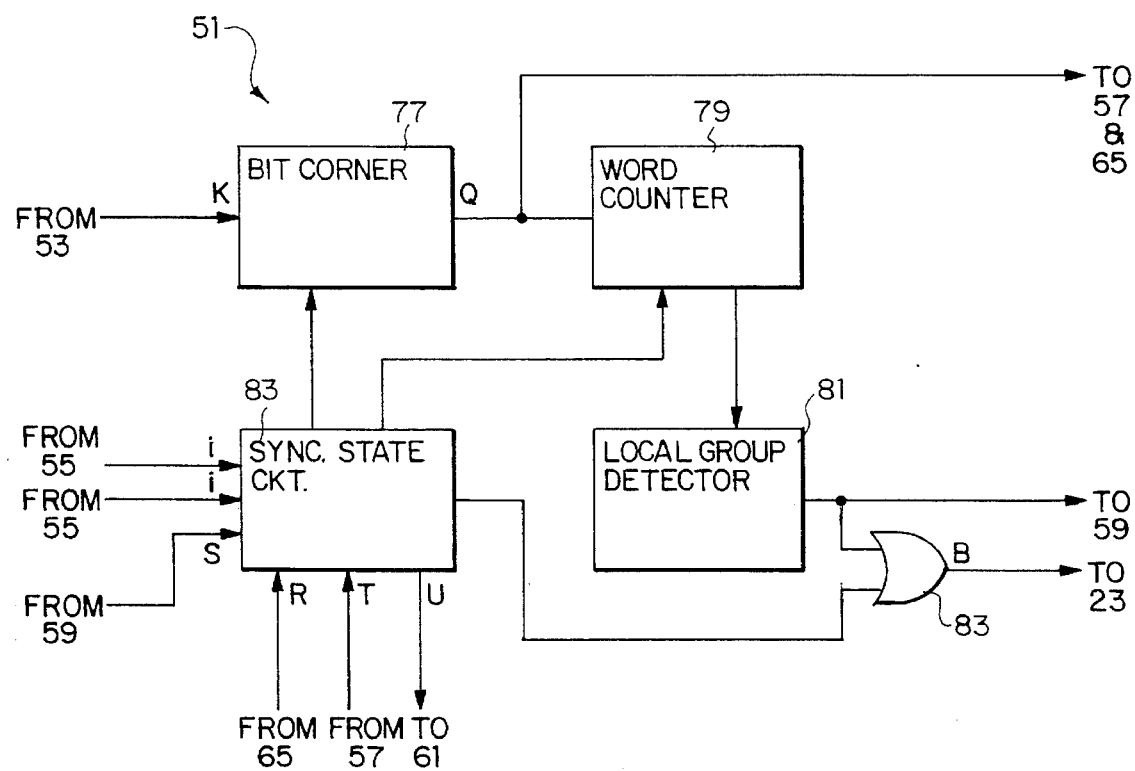
FIG. 7, drawn below

Referring to FIG. 7 the synchronism control circuit 51 will be described in greater detail. FIGS. 1 through 4 are additionally referred to. In the manner which will presently become clear, a bit count reset signal and a word count reset signal are produced and used when the preamble and synchronization signal detector 55 produces the preamble and the synchronization signal detection signals to thereby begin indication of the zeroth or the most significant bit of the immediately following signal and indication of the immediately following signal, respectively.

A bit counter 77 is supplied from the bit synchronization circuit 53 with the regenerated clock pulses K and is reset by the bit count reset signal to an initial count of zero representative of the zeroth bit under consideration. Cyclically counting the regenerated clock pulses from zero up to a full count of thirty-one representative of the thirty-first or the least significant bit of each of the synchronization signal and the code words of each batch, the bit counter 77 produces the code word timing signal Q which cyclically times the synchronization signal and the first through the sixteenth code words of each batch in the batch streams. The code word timing signal is delivered, among others, to the error correcting circuit 57 and to the bit rate detection unit 65. Incidentally, the preamble signal corresponds to eighteen code words.

A word counter 79 is supplied with the code word timing signal and is reset by the word count reset signal to an initial count of zero representative of the immediately following signal. Cyclically counting from zero to a full count of seventeen the synchronization signal and the code words indicated by the code word timing signal in each batch, the word counter 79 produces a batch count signal which successively represents the batches in the batch streams. While representing each batch, the batch count signal serially indicates the synchronization signal and the first through the sixteenth code words.

A local group detector 81 is supplied with the batch count signal to detect the specific group mentioned heretobefore. In the example being illustrated, the local group detector 81 produces the local group timing signal with a logic one level during the third and the fourth code words of each batch for supply to the selective call detector 59.

An OR gate 83 is supplied with the local group timing signal to produce a gate output signal as the battery save control signal B for delivery to the radio unit 23. By the local group timing signal, the gate output signal is intermittently given the high level as illustrated in FIG. 3 at B(1).

A synchronization state circuit 85 is supplied from the preamble and synchronization signal detector 55 with the preamble and the synchronization signal detection signals i and j, from the selective call signal detector 59 with the coincidence signal, from the bit rate detecting unit 65 with the bit rate detection signal R, and from the error correcting curcuit 57 with the out of synchronism signal. The synchronization state circuit 85 thereby produces the bit and the word count reset signals described above, an intermediate control signal with the logic one level, and the synchronism monitor signal.

The synchronism monitor signal is delivered to the interface circuit 61 and thence to the interruption control circuit 63 and, through the data bus F, to the processor unit 27. The intermediate control signal is sent to the OR gate 83. By the intermediate control signal, the gate output signal is given the high level during growth of the preamble signal and/or during presence of the bit rate detection signal, the immediately following signal, the selective call signal, and the particular message signal.

Figure 8:
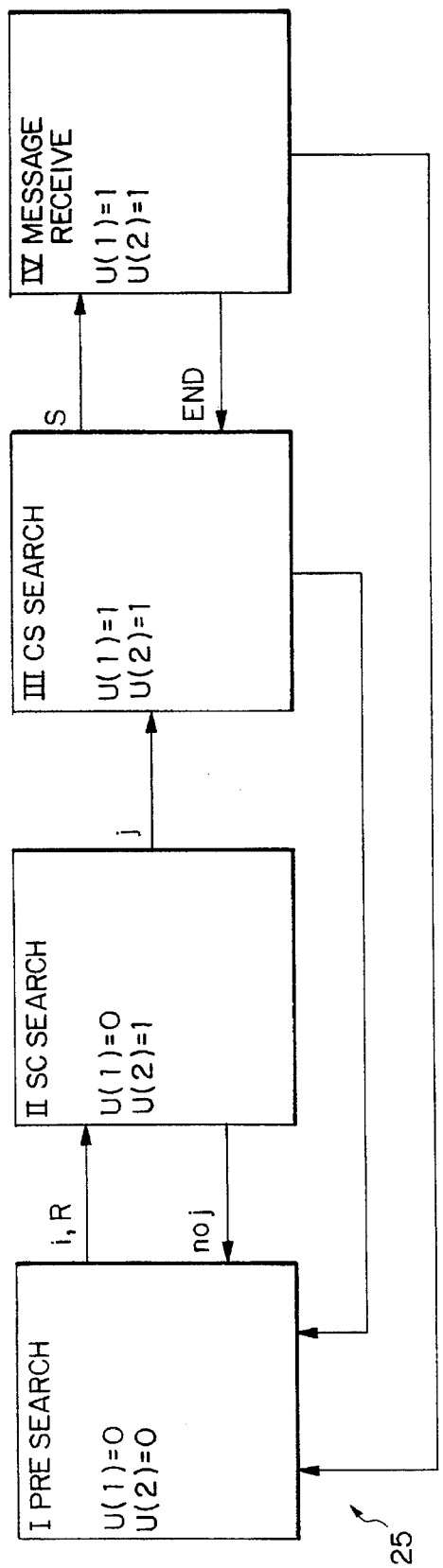
FIG. 8 shows a state transition diagram for use in describing operation of the decoder unit shown in FIG. 4.

Turning to FIG. 8 with FIGS. 2, 3, 4, and 7 referred to in addition, the synchronization state curcuit 85 or the decoder unit 25 has first through fourth states I, II, III, and IV. The coincidence signal, the out of synchronism signal, and the synchronism monitor signal will now be denoted by reference symbols S, T, and U. Incidentally, the synchronism monitor signal is designated by U(1) for the reason which will later become clear.

It will first be assumed that the receiving unit (23, 25) is put in the preamble signal (PRE) search mode. Inasmuch as such modes are primarily specified by the battery save control signal, it is possible to undersand that these modes are had by the decoder unit 25. When put in the preamble signal search mode, the decoder unit 25 is put in the first state. The synchronism monitor signal U(1) is given the binary zero level 0.

When either the preamble signal detection signal i or the bit rate detection signal R is produced during the preamble signal search mode, the doceder unit 25 is subjected to a first forward state transition from the first state to the second state. The decoder unit 25 is put in the synchronization signal (SC) search mode. The synchronism monitor signal is kept at the binary zero level.

During the synchronization signal search mode, the preamble and synchronization signal detector 55 may fail to detect the immediately following signal to produce no synchronization signal detection signal j. This may not be seldom the case when the bit rate detection signal is used in place of the preamble signal detection signal. In such an event, the decoder unit 25 is subjected to a first backward or inverse state transition from the second state back to the first state.

When the synchronization signal detection signal j is supplied to the synchronization state circuit 85, a second forward state transition takes place. The second state is switched forward to the third state. The decoder unit 25 is put in the call signal search mode. The synchronism monitor signal U(1) is given the binary one level 1.

If the error correcting circuit 57 produces the out of synchronism signal T while the decoder unit 25 is put in the third state, a second backward state transition occurs. The third state changed backwards to the first state. The synchronism monitor signal is changed from the binary one level to the binary zero level.

While the decoder unit 25 is put in the third state, the selective call detector 59 may produce the coincidence signal Q. In this event, the third state is subjected to a third forward state transition forward to the fourth state in which the error correcting circuit 57 produces the data signal representative of the particular message signal. In response, the processor unit 27 stores the message signal in the buffer region of the random access memory 33. The synchronism monitor signal is kept at the binary one level.

When the message signal comes to the message end as indicated by a label END, the fourth state is subjected to a third normal backward state transition to the third state. The synchronism monitor signal remains at the binary one level.

If the error correcting circuit 57 produces the out of synchronism signal T during the message signal receiving mode, a third exceptional backward state transition takes place from the fourth state far back to the first state. Thy synchronism monitor signal is switched from the binary one level to the binary zero level.

Figure 9:
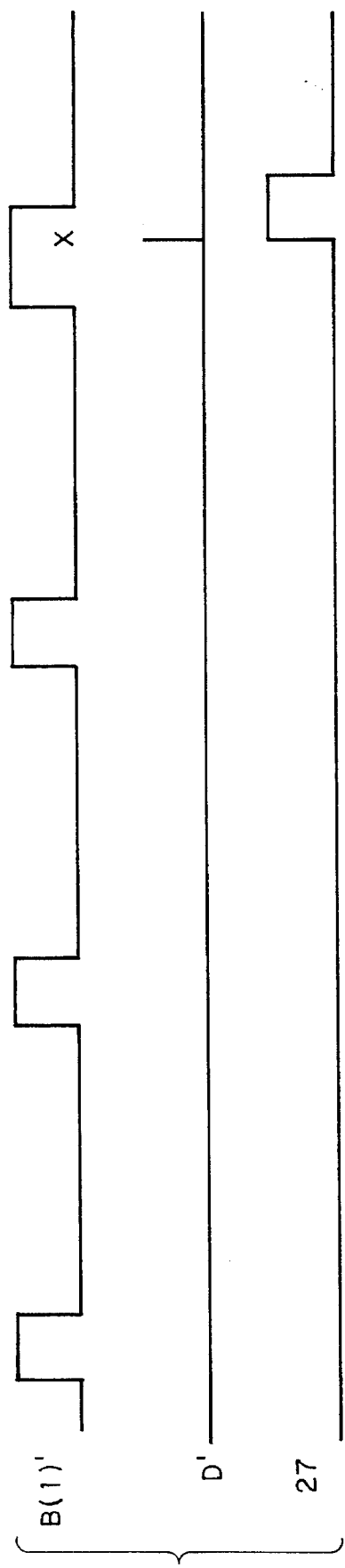
FIG. 9 shows a time chart for use in describing operation of a processor unit which is used in the radio receiver illustrated in FIG. 2.

FIG. 9 will now be referred to with FIGS. 1 through 4 and 8 continuously referred to. It will be presumed that the preamble signal is erroneously detected, for some reason or other, by the preamble and synchronization signal detector 55 to make the synchronism control circuit 51 intermittently give the high level to the battery save control signal during the call signal search mode in mismatch with the third and the fourth code words of the demodulated signal as exemplified by a cross along a first or top row indicated by B(i)' in one of the batch streams that would start at the erroneously detected preamble signal.

Before the synchronism collapses in this manner, namely, until a time instant indicated by the cross, the decoder unit 25 was in the third state described in conjunction with FIG. 8. The synchronism monitor signal U(1) was kept at the binary one level. At the time instant of the cross, the binary one level of the synchronism monitor signal is changed to the binary zero level. Through the interface circuit 61, this cange of the synchronism monitor signal makes the interruption control circuit 63 switch the interruption signal from the binary one level to the binary zero level. It will now be said that a synchronism collapse signal D' is produced by the interruption control circuit 63 as a result of this switching in the manner depicted along a second or middle row with a label D'.

Supplied to the processor unit 27, the synchronism collapse signal triggers in the electrically erasable programmable read-only memory 31 a bit rate detection control routine. This trigger and consequent progress of the routine is indicated by a high level which is illustrated along a third or bottom row labelled 27.

Figure 10:
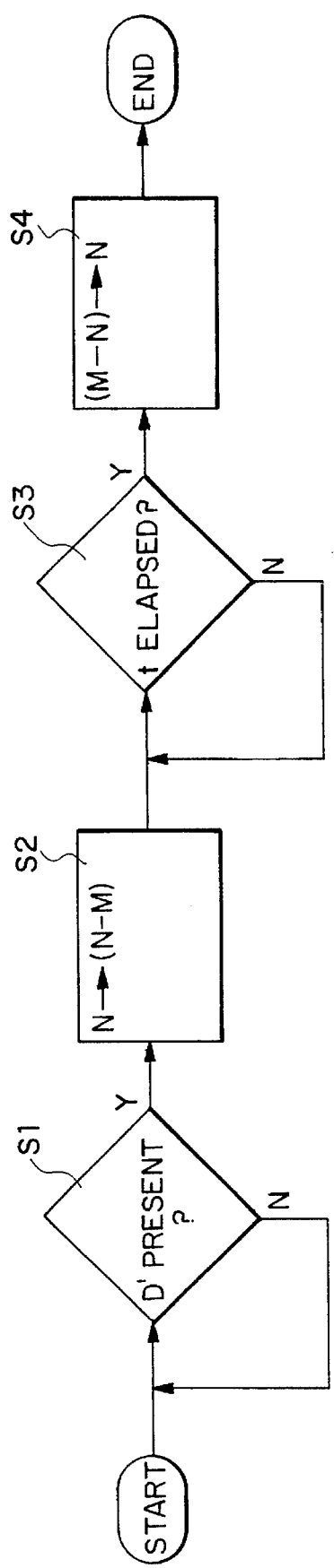
FIG. 10 shows a flow chart for use in describing operation of the processor unit mentioned in connection with FIG. 9.

Turning to FIG. 10 with FIGS. 2, 4 through 6, and 9 additionally referred to, the bit rate detection control routine proceeds as follows. It is possible to understand that the radio receiver comprises the routine as a bit rate detection control software arrangement in the processor unit 27. The software arrangement calculates the edge counter value for use in the bit rate detecting unit 65 and is therefore connected to the bit rate detecting unit 65.

At a first step S1, the software arrangement repeatedly searches for the synchronism collapse signal D'. Triggered by the synchronism collapse signal, the software arrangement begins to control the edge counter value.

At a second step S2, the software arrangement reduces the edge counter value from an ordinary counter value N to a reduced counter value (N–M), where a counter value decrement M should be less than the ordinary counter value. It is possible to use an adjustable counter value as the ordinary counter value. Preferably, the ordinary counter value is empirically decided.

When the reduced counter value is stored in the edge count store 73 through the interface circuit 61, the bit rate detecting unit 65 produces the bit rate detection signal with an accordingly raised sensitivity, namely, with a high sensitivity. In other words, the specific bit rate is detected with the high sensitivity even though subjected to the failure.

At a third step S3, the software arrangement checks whether or not a preselected time interval t has elapsed from start of reduction of the edge counter value. During the preselected time interval, the software arrangement keeps the edge counter value at the reduced counter value. The preselected time interval is empirically determined, for example, as a few batch periods.

After lapse of the preselected time interval, the software arrangement begins to increase at a fourth step S4 the reduced counter value. When the edge counter value is restored to the ordinary counter value, the bit rate detection control routine comes to an end.

The software arrangement suspends its operation until the interruption control circuit 63 produces another synchronism collaspe signal. It is now understood that the software arrangement enables the bit rate detecting unit 65 to detect the specific bit rate within a predetermined sensitivity range between the ordinary and the reduced counter values, namely, between an ordinary and a raised sensitivity.

Reviewing FIGS. 2 through 10 with FIG. 1 taken into account, it is understood that a selectively called radio receiver comprises a combination of the reference clock generator 49, the synchronism control circuit 51, the bit synchronization circuit 53, the preamble and synchronization signal detector 55, the error correcting circuit 57, the selective call detector 59, the interface circuit 61, and the interruption control circuit 63 as a synchronizing unit for establishing and keeping synchronism between a demodulated signal C and operation of the receiving unit (23, 25). For use in assisting operation of the synchronizing unit (49–63) when the synchronizing units fails to keep the synchronism, the bit rate detecting unit 65 detects a specific bit rate of the demodulated signal with a controllable sensitivity. Connected to the synchronizing unit and to the bit rate detecting unit 65, a bit rate detection means (27) controls the sensitivity within a predetermined sensitivity range while the synchronizing unit fails to keep the synchronism.

In the selectively called radio receiver, the bit rate detecting unit 65 has an ordinary and a high sensitivity as the controllable sensitivity. The bit rate detection control arrangement gives the ordinary and the high sensitivities as limits of the predetermined sensitivity range to the bit rate detecting unit 65 while the synchronizing unit fails to keep the synchronism. The preamble signal and the immediately following signal of the synchronization signals are detected by the preamble and synchronization signal detector 55. The selective call signal and the particular message signal are detected by cooperation of the error correcting circuit 57, the selective call detector 59, and the processor unit 27.

A combination of the reference clock generator 49, the synchronism control circuit 51, the bit synchronization circuit 53, the preamble and synchronization signal detection 55, the interface circuit 61, and the interruption control circuit 63 serves as a synchronism keeping subunit. Responsive to the preamble and the immediately following signals, the synchronism keep subunit (49, 51, 53, 55, 61, 63) establishes and keeps the synchronism to produce an interruption signal D with a first level, such as the binary zero level. Another combination of the error correcting circuit 57, the selective call detector 59, the interface circuit 61, and the interruption control circuit 63 serves as a synchronism detecting subunit. Connected to the synchronism keeping subunit, the synchronism detecting subunit (57, 59, 61, 63) detects at least one of the synchronization signals among the selective call and the particular message signals to find collapse of the synchronism and to thereupon give a second level, such as the binary one level, to the interruption signal. The bit rate detection control arrangement gives the high and the ordinary sensitivities to the bit rate detecting unit 65 when the interruption signal is switched from the second level to the first level and from the first level to the second level, respectively.

The bit rate detection control means comprises a processor unit 27 and as a sensitivity control means a data bus F. Connected to the synchronism keeping and the synchronism detecting subunits, the processor unit 27 calculates an edge counter value and gives an ordinary (N) and a reduced (N–M) count to the edge counter value when supplied with the interruption signal of the first and the second levels, respectively. Connected to the bit rate detecting and the processor units 65 and 27, the sensitivity control means (27, F) gives the high and the ordinary sensitivities to the bit rate detecting unit 65 when the edge counter value is switched from the reduced count to the ordinary count and from the ordinary count to the reduced count, respectively.

When the bit rate detection control means comprises the processor unit 27 and the sensitivity control means, the synchronizing unit comprises the reference clock generator 49 for generating reference clock pulses G at the specific bit rate. Responsive (A) to the reference clock pulses and (B) to (B1) the synchronization signals and (B2) the code words of the batch streams, the bit synchronization circuit 53 serves as a clock regenerator for generating regenerated clock pulses K in one-to-one correspondence to the reference clock pulses. A combination of the synchronism control circuit 51, the preamble and synchronization signal detector 55, the interface circuit 61 and the interruption control circuit 63 serves as a synchronization keeping circuit. Responsive to the preamble signal, the immediately following signal, and the regenerated clock pulses, the synchronism keeping circuit (49, 51, 53, 55, 61, 63) keeps the synchronism and gives the first level to the interruption signal.

When the selectively called radio receiver is structured in the manner described in the foregoing, the bit rate detecting unit 65 comprises the window generator 67. Connected to the reference clock generator 49 and to the clock regenerator .(53), the window generator 67 generates windows (L) between the reference clock pulses and the corresponding regenerated clock pulses. Connected to the window generator 67 and to the receiving unit (23, 25), an edge or edge position detector 69 judges whether or not the demodulated signal has an edge in one of the windows. The edge detector 69 thereby produces an edge detection pulse P when the edge is detected in one of the windows. Each time when produced, the edge detection pulse is counted up by an edge counter 71 as an edge count. A combination of the edge count store 73 and the edge comparator 75 serves as a bit rate detecting subunit. Connected to the edge counter 71 and to the processor unit 27, the bit rate detecting subunit (73, 75) detects the specific bit rate with the ordinary and the high sensitivities when the edge counter value is equal to the ordinary and the reduced counts, respectively.

FIGS. 2, 4, and 7 will now be reviewed in order to describe a selectively called radio receiver according to a second embodiment of this invention. When produced in the manner described before, the synchronism monitor signal U will be called a single synchronism monitor signal. The interruption signal D will be referred to as a single inturruption signal.

The synchronism control circuit 51 now produces first and second synchronism monitor signals U(1) and U(2). More particularly, the synchronization state circuit 85 delivers the first and the second synchronism monitor signals to the interface circuit 61 in the manner which will presently become clear. Supplied with the first and the second synchronism monitor signals through the interface circuit 61, the interruption control circuit 63 supplies the processor unit 27 with first and second interruption signals D(1) and D(2), respectively, each with one of the binary zero and one levels at a time, in the manner described in conjunction with FIG. 2.

FIG. 8 will again be referred to with FIGS. 2, 4, and 7 once more taken into consideration. In the manner described before, the first backward, the second backward and the third exceptional backward state transistions take place from the second state to the first state and from the third and the fourth states to the first sate when the preamble and synchronization signal detector 55 produces no synchronization signal detection signal j and when the error correcting circuit 57 produces the out of synchronism signal T.

When the decoder unit 25 is put in the first state, the synchronization state circuit 85 produces the first and the second synchronism monitor signals, each with the binary zero level. When the decoder unit 25 is put in the second state, the synchronization state circuit 85 produces the first synchronism monitor signal with the binary zero level and the second synchronism monitor signal with the binary one level. When the decoder unit 25 is put in the third or the fourth state the synchronization state circuit 85 produces the first and the second synchronism monitor signals, each with the binary one level.

Figure 11:
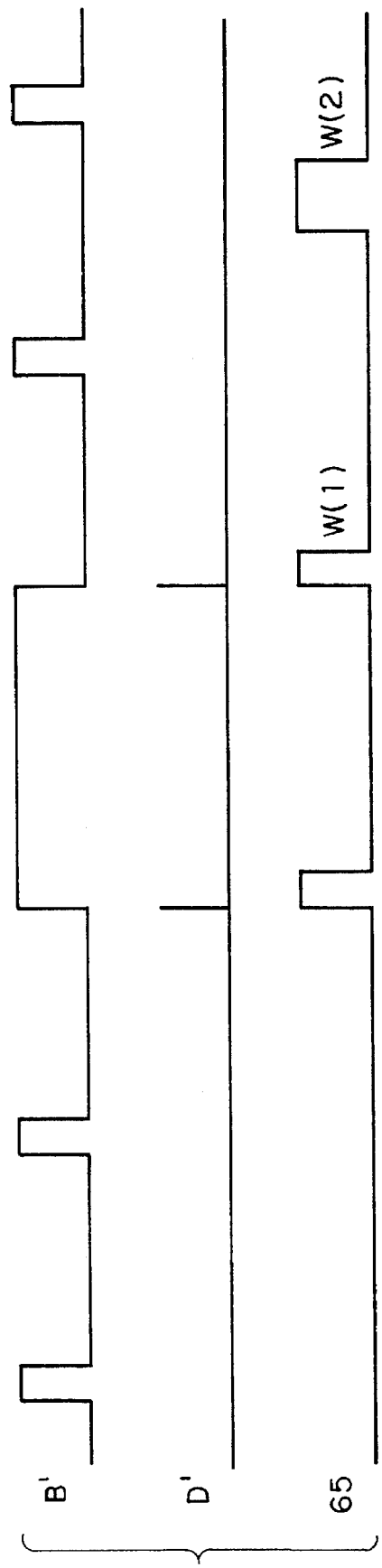
FIG. 11 shows a time chart for use in describing operation of a processor unit which is used in a selectively called radio receiver according to a second embodiment of this invention.

Referring afresh to FIG. 11 and once more to FIGS. 2, 4, and 8, it is presumed that the bit rate detecting unit 65 gives rise to misdetection of the specific bit rate by detecting the pseeudo or false bit rate mentioned hereinabove. Before the misdetection begins to take place, the decoder unit 25 was subjected to either the second backward or the third exceptional backward state transition. Each of the first and the second synchronism monitor signals U(1) and U(2) is switched from the binary one level 1 to the binary zero level 0.

It will be assumed that the synchronism control circuit 51 produces the battery save control signal as illustrated along a first or top row labelled B'. When the pseudo bit rate is detected, the battery save control signal builds up to the high level. The bit rate detection signal R may, however, not be immediately followed by the immediately following signal of the synchronization signals. As a result, no synchronization signal detection signal j would be produced. The first synchronism monitor signal is kep at the binary zero level. When the synchronization signal detection signal is produced, the second synchronism monitor signal is given the binary one level in the manner exemplified by a long high level of the battery save control signal.

The synchronism collapse signal D' is produced as depicted along a second or middle row with the label D'.

When each of the first and the second synchronism monitor signals is changed from the binary one level to the binary zero level, the bit rate detection control arrangement is triggered as a first software arrangement. Furthermore, a second software arrangement is put into operation in the manner which will later become clear.

Turning to FIG. 12 with FIGS. 2, 4, 5, 8, and 11 additionally referred to, the second software arrangement is operable as follows, in order to put the second software arrangement in operation, the processor unit 27 comprises a general purpose timer and a misdetection counter, both of which may merely be parts of the work area of the processor unit 27.

The general purpose timer is for measuring a prescribed time interval t' which is preferably adjustable and may be one or more minutes long. The misdetection counter is for counting, as a misdetection count V up from an initial count of zero, how many times the misdetection of the specific bit rate takes place. Based on the misdetection count, the second software arrangement calculates a misdetection ratio V'. It will be surmised that the second software arrangement ordinarily gives the above-mentioned ordinary counter value N to the edge counter value.

The second software arrangement monitors the inturruption signal D to repeatedly search at a first primary step SP1 for a first change D'(1) of the second synchronism monitor signal from the binary zero level 0 to the binary one level 1. When the first change is detected, the second software arrangement searches at a second primary step SP2 for a second change D'(2) at which the second synchronism monitor signal is switched from the binary one level 1 to the binary zero level 0 with the first synchronism monitor signal kept at the binary zero level 0 as a result of production of no synchronization signal detection signal j. When the second change is detected, the second softaare arrangemend adds one to the initial count at a third primary step SP3 to provide a current count. The second and the third primary steps are repeated to consecutively count up the current count to the misdetection count V.

While the current count is counted up, the second software arrangement checks the misdetection count. More particularly, the second software arrangement repeatedly checks at a fourth primary step SP4 the general purpose timer to judges whether or not the prescribed time interval t' has elapsed. After lapse of the prescribed time interval, the second software arrangement reads the misdetection count V at a fifth primary step SP5 from the misdetection counter. At a sixth primary step SP6, the second software arrangement calculates the misdetection rate V' and judges whether or not the misdetection rate is less than a predetermined rate X which is preferably empirically determined.

If the misdetection rate is not less than the predetermined rate, the second software arrangement adds one at a seventh primary step SP7 to the ordinary counter value N to provide an incremented counter value (N+1). The bit rate detecting unit 65 is given a reduced sensitivity so as not to detect the pseudo bit rate. The misdetection rate is accordingly decremented.

Later, the second software arrangement resets the misdetection counter to the initial value of zero at an eighth primary step SP8. In FIG. 11, an incremement of the edge counter value is indicated by a first pulse W(1) along a third or bottom row labelled 65. Control of the controllable sensitivity and reset of the misdetection counter are indicated by a second pulse W(2).

It is now appreciated that the second software arrangement keeps the misdetection rate within a predetermined rate range which is determined by the predetermined rate X. The predetermined sensitivity range is determined by a difference between the ordinary counter value and the incremented counter value.

Figure 13:
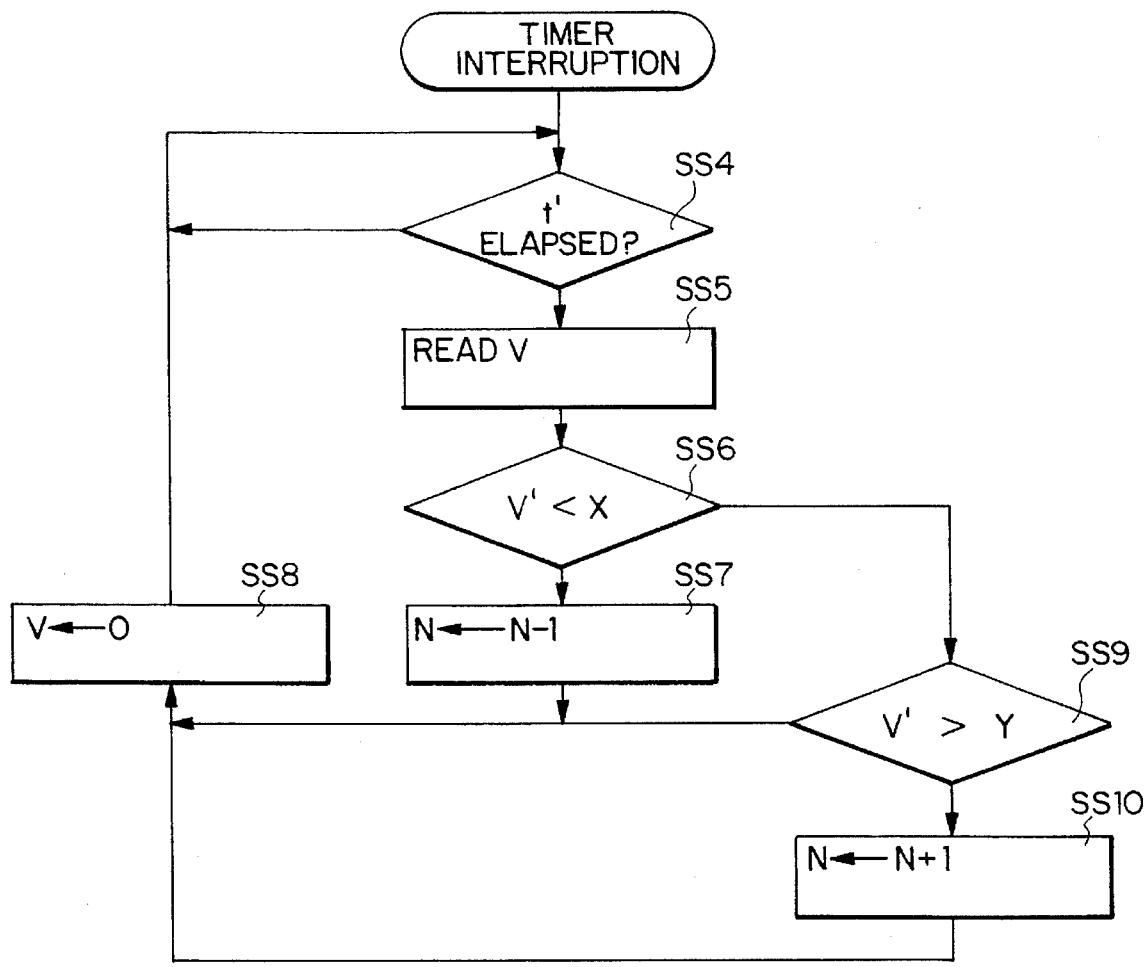
FIG. 13 is a flow chart for use in describing operation of a processor unit which is used in a selectively called radio receiver in accordance with a modification of the radio receiver mentioned in connection with FIG. 12.

Further turning to FIG. 13 with FIGS. 2, 4, 5, and 8 continuously referred to, it is possible to substitute a modified software arrangement for the second software arrangement illustrated with reference to FIG. 12. This is in order for preventing the controllable sunsitivity from being much reduced. The modified software arrangement uses the above-mentioned predetermined rate X as a first predetermined rate. In addition, use is made of a second predetermined rate Y which is smaller than the first predetermined rate.

First through fifth secondary steps SS1 to SS5 are not different from the first through the fifth primary steps SP1 to SP5 and will therefore not be described any further. At a sixth secondary step SS6, the modified software arrangement checks whether or not the misdetection rate V' is less than the first predetermined rate X. If the misdetection rate is not less than the first predetermined rate, the modffied software arrangement adds one at a seventh secondary step SS7 to the ordinary counter value N to prodive an incremented counter value (N+1). Later, the misdetection counter is reset at an eighth secondary step SS8 to the initial count.

If the misdetection rate is less than the first predetermined rate, the modified software arrangement checks at a ninth secondary step SS9 whether or not the misdetection rate V' is greater than the second predetermined rate Y. If the misdetection rate is greater than the second predetermined rate, the modified software arrangement resets the misdetection counter to the initial count at the eighth secondary step SS8. If the misdetection rate is not greater than the second predetermined rate, the modified software arrangement subtracts one from the ordinary counter value at a tenth secondary step SS10 to provide a decremented counter value (N−1). Consequently, the bit rate detecting unit 65 produces the bit rate detection signal with an ordinary sensitivity determined by the ordinary counter value N.

It is now appreciated that the modified software arrangement determines the predetermined rate range between the first and the second preteternined rates X and Y. By the second software arrangement illustrated with reference to FIG. 12, the controllable sensitivity of the bit rate detecting unit 65 is left at the reduced sensitivity. In contrast, the modified software arrangement automatically resets the reduced sensitivity back to the ordinary sensitivity.

Reviewing FIGS. 2 through 8 and 11 through 13, it is understood that the selectively called radio receiver comprises the bit rate detection control arrangement (27) as a first software arrangement. In the first software arrangement, a combination of the primary steps SP1 through SP8 serves as a second software arrangement and another combination of the secondary stpes SS1 through SS10, as a modified software arrangement.

In the selectively called radio receiver, the bit rate detecting unit 65 is liable to misdetect the specific bit rate with a variable misdetection rate V' while the synchronizing unit (49–63) fails to keep the synchronism. The misdetection rate is measured by a misdetection count V. In other words, the bit rate detecting unit 65 may mistetect the specific bit rate to increase the misdetection count to an accumulated count V from an initial count of zero which represents no misdetection.

The second software arrangement decrements the misdetection count to the initial count after the accumulated count reaches a predetermined count corresponding to the predetermined rate X. The modified software arrangement controls the variable misdetection rate between the first and the second predetermined rates X and Y, where the second predetermined rate is less than the first predetermined rate.

While this invention has thus far been described in specific conjunction with ony two preferred embodiments thereof and a modification, it will now be readily possible for one skilled in the art to put this invention into practice in various other manners. Above all, it is possible to understand that a variation in the synchronism monitor signal U during progress of the preamble signal search mode, the call signal search mode, or the message signal receiving mode as appearance of the synchronism collapse signal D' as it stands. It is possible to store the program and the selective call datum in a built-in memory area of the processor unit 27.

What is claimed is:

1. A selectively called radio receiver including a receiving unit operable with battery saving to produce a demodulated signal having a specific bit rate, said radio receiver comprising:

a synchronizing unit for establishing and keeping synchronism between said demodulated signal and operation of said receiving unit;

a bit rate detecting unit for detecting said bit rate with a controllable sensitivity to assist operation of said synchronizing unit when said synchronizing unit fails to keep said synchronism; and bit rate detection control means connected to said synchronizing and said bit rate detectiong units for controlling said sensitivity within a predetermined sensitivity range while said synchronizing unit fails to keep said synchronism.

2. A selectively called radio receiver as claimed in claim 1, wherein:

said bit rate detecting unit is given an ordinary sensitivity and a high sensitivity higher than said ordinary sensitivity by said predetermined sensitivity range;

said bit rate detection control means giving said ordinary sensitivity and said high sensitivity to said bit rate detecting unit while said synchronizing unit keeps and fails to keep said synchronism, respectively.

3. A selectively called radio receiver as claimed in claim 2, said demodulated signal comprising a plurality of serial batch streams, each batch stream comprising a preamble signal and a succession of batches following said preamble signal and including synchronization signals in said batches, respectively, one of said synchronization signals immediately following said preamble signal as an immediately following signal, wherein:

said synchronizing unit comprises a synchronism keeping subunit responsive to said preamble signal and to said immediately following signal for establishing and keeping said synchronism to produce an interruption signal with a first level and a synchronism detecting subunit connected to said synchronism keeping subunit for detecting at least one of said synchronization signals to find collapse of said synchronism and to thereby give a second level to said interruption signal;

said bit rate detection control means giving said high and said ordinary sensitivities to said bit rate detecting unit when said interruption signal is switched from said second level to said first level and from said first level to said second level, respectively.

4. A selectively called radio receiver as claimed in claim 3, one of said batches including in one of said batch streams a selective call signal, at least said one of batch streams comprising said at least one of the synchronization signals and a message signal following said selective call signal, wherein said synchronism detecting subunit detects said message signal unless said collapse of synchronism is detected.

5. A selectively called radio receiver as claimed in claim 4, each of said batches comprising in each of said batch streams one of said synchronization signals and a sequence of code words following sad one of the synchronization signals, a predetermined at least one of the code words of said sequence representing said selective call signal with said message signal represented by the code words following sid selective call signal, wherein:

said bit rate detection control means comprises a processor unit connected to said synchronism keeping and said synchronism detecting subunits for calculating an edge counter value to give an ordinary and a reduced count to said edge counter value when supplied with said interruption signal with said first and said second levels, respectively, and sensitivity control means connected to said bit rate detecting and said processor units for giving said high and said ordinary sensitivities to said bit rate detecting unit when said edge counter value is switched from said reduced count to said ordinary count and from said ordinary count to said reduced count, respectively;

said synchronism keeping subunit comprising a reference clock generator for generating reference clock pulses at said bit rate, a clock regenerator responsive to said reference clock pulses and to said synchronization signal and the code words of each batch of said batch streams for producing regenerated clock pulses in one-to-one correspondence to said reference clock pulses, and a synchronism keeping circuit responsive to said preamble signal, to said immediately following signal, and to said regenerated clock pulses for keeping said synchronism to give said first level to said interruption signal;

said bit rate detecting unit comprising:

a window generator connected to said reference clock generator and said clock regenerator for generating windows between said reference clock pulses and the regenerated clock pulses corresponding to said reference clock pulses;

an edge detector connected to said receiving unit and to said window generator for judging whether or not said demodulated signal has an edge in one of said windows, said edge detector producing an edge detection pulse when said edge is detected in said one of the windows;

an edge counter for counting up an edge count each time when said edge detection pulse is produced; and a bit rate detecting subunit connected to said processor unit and to said edge counter for detecting said bit rate with said ordinary and said high sensitivities when said edge count is equal to said ordinary and said reduced counts, respectively.

6. A selectively called radio receiver as claimed in claim 1, wherein:

said bit rate detecting unit is liable to misdetect said bit rate with a variable misdetection rate while said synchronizing unit fails to keep said synchronism;

said bit rate detection control means controlling said sensitivity within said predetermined sensitivity range to keep said misdetection rate within a predetermined rate range.

7. A selectively called radio receiver as claimed in claim 6, wherein:

said bit rate detecting unit misdetects said bit rate to accumulate said misdetection rate to an incremented rate from an initial rate representative of no misdetection;

said bit rate detection control means decrementing said misdetection rate to said initial rate when said incremented rate reaches a predetermined rate.

8. A selectively called radio receiver as claimed in claim 6, wherein:

said bit rate detecting unit misdetects said bit rate to accumulate said misdetection rate to an incremented rate from an initial rate representative of no misdetection;

said bit rate detection control means controlling said misdetection rate between a first and a second predetermined rate when said incremented rate reaches said first predetermined rate, said first predetermined rate being greater than said second predetermined rate, said bit rate detection control means subsequently causing said misdetection rate return to said initial rate.

* * * * *

UNITED STATES PATENT AND TRADEMARK OFFICE
CERTIFICATE OF CORRECTION

PATENT NO.   : 5,487,090
DATED        : January 23, 1996
INVENTOR(S)  : Motoki IDE It is certified that error(s) appears in the above-identified patent and that said Letters Patent is hereby corrected as shown below:

Column 16, line 21, delete "2" and insert therefor --7--.

Signed and Sealed this

Sixth Day of August, 1996

Attest:

BRUCE LEHMAN

*Attesting Officer*   Commissioner of Patents and Trademarks